(12) United States Patent
Koike et al.

(10) Patent No.: US 11,542,900 B2
(45) Date of Patent: Jan. 3, 2023

(54) BATTERY TEMPERATURE ADJUSTING DEVICE FOR VEHICLE, VEHICLE, AND METHOD OF ADJUSTING BATTERY TEMPERATURE FOR VEHICLE

(71) Applicant: Mazda Motor Corporation, Hiroshima (JP)

(72) Inventors: Yusuke Koike, Aki-gun (JP); Yusuke Marutani, Aki-gun (JP); Toshiki Takahashi, Aki-gun (JP); Wataru Masuda, Aki-gun (JP); Takafumi Tanehira, Aki-gun (JP); Yuma Yamaga, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 235 days.

(21) Appl. No.: 17/103,855

(22) Filed: Nov. 24, 2020

(65) Prior Publication Data

US 2021/0262424 A1 Aug. 26, 2021

(30) Foreign Application Priority Data

Feb. 26, 2020 (JP) .............................. JP2020-030979

(51) Int. Cl.
*F02M 35/10* (2006.01)
*B60K 17/04* (2006.01)
(Continued)

(52) U.S. Cl.
CPC ....... *F02M 35/10144* (2013.01); *B60K 17/04* (2013.01); *B60R 16/033* (2013.01);
(Continued)

(58) Field of Classification Search
CPC ........... F02M 35/10144; F02M 31/205; F02M 35/10262; B60K 17/04; B60R 16/033; F02D 41/0002; F02D 2200/021; F02D 2200/023; F02D 2200/501; F02D 2200/70; H01M 10/613; H01M 10/63;
(Continued)

(56) References Cited

FOREIGN PATENT DOCUMENTS

| CN | 111605432 A | * | 9/2020 |
| JP | H0585197 A | | 4/1993 |

* cited by examiner

*Primary Examiner* — Jacob M Amick
*Assistant Examiner* — Charles J Brauch
(74) *Attorney, Agent, or Firm* — Alleman Hall Creasman & Tuttle LLP

(57) ABSTRACT

A battery temperature adjusting device for a vehicle on which a battery is mounted, the battery being a lithium ion battery disposed near a powertrain unit inside an engine bay, is provided. The device includes a first air duct provided to an intake passage configured to lead intake air to a combustion chamber of an engine, a second air duct provided to the intake passage and provided with an intake opening that opens toward a space between the powertrain unit and the battery, an intake-air-amount adjusting part, and a controller configured to acquire an ambient temperature of the powertrain unit. The controller increases a ratio of the second intake air amount relative to the sum of the first intake air amount and the second intake air amount, when the ambient temperature exceeds a first threshold temperature, compared with when the ambient temperature is below the first threshold temperature.

19 Claims, 11 Drawing Sheets

(51) Int. Cl.
*F02M 31/20* (2006.01)
*F02D 41/00* (2006.01)
*H01M 10/613* (2014.01)
*H01M 10/625* (2014.01)
*H01M 10/6563* (2014.01)
*H01M 10/63* (2014.01)
*B60R 16/033* (2006.01)

(52) U.S. Cl.
CPC ....... *F02D 41/0002* (2013.01); *F02M 31/205* (2013.01); *F02M 35/10262* (2013.01); *H01M 10/613* (2015.04); *H01M 10/625* (2015.04); *H01M 10/63* (2015.04); *H01M 10/6563* (2015.04); *F02D 2200/021* (2013.01); *F02D 2200/023* (2013.01); *F02D 2200/501* (2013.01); *F02D 2200/70* (2013.01); *H01M 2220/20* (2013.01)

(58) Field of Classification Search
CPC ......... H01M 10/6563; H01M 2220/20; H01M 10/0525; H01M 10/486; H01M 10/635; Y02E 60/10; Y02T 10/12
See application file for complete search history.

BATTERY TEMPERATURE ADJUSTING DEVICE FOR VEHICLE, VEHICLE, AND METHOD OF ADJUSTING BATTERY TEMPERATURE FOR VEHICLE

TECHNICAL FIELD

The present disclosure relates to a battery temperature adjusting device for a vehicle, a vehicle provided with the battery temperature adjusting device, and a method of adjusting a battery temperature of the vehicle.

BACKGROUND OF THE DISCLOSURE

A small-sized battery is mounted inside an engine bay, mainly for the purpose of supplying power to a starter motor when starting an engine, and supplying power when lighting inside a cabin and audiovisual apparatuses are used while the engine is stopped.

For example, JP1993-085197A discloses a technology for cooling a battery using a portion of intake air extracted from an intake pipe of an engine.

Meanwhile, although a lead storage battery is used as the small-sized battery described above, a lead storage battery may be replaced with a lithium ion battery in consideration of environmental problems, such as the lead regulations in Europe.

Lithium ion batteries are narrow in the optimum range of the temperatures of the battery and its periphery, as compared with lead storage batteries, and demonstrate the most excellent charge-and-discharge characteristics in a specific temperature range (e.g., about 25° C. to 40° C.). If the temperature of a lithium ion battery and its periphery deviates from this temperature range, degradation of the lithium ion battery progresses, and therefore, the battery life is shortened.

Inside the engine bay, the ambient temperature of a powertrain unit including an engine and a transmission may rise, especially during a high-load operation, due to exhaust heat from the powertrain unit. If the battery is disposed near the powertrain unit, the temperatures of the battery and its periphery may rise greatly, which leads to rapid degradation of the battery.

SUMMARY OF THE DISCLOSURE

Therefore, the present disclosure provides a battery temperature adjusting device for a vehicle, the vehicle provided with the battery temperature adjusting device, and a method of adjusting a battery temperature for the vehicle, which can maintain temperature of the battery mounted in an engine bay, and its periphery within a suitable temperature range.

In order to solve the problem, the present disclosure takes heat from a powertrain unit into an intake passage of an engine to suppress the heat from reaching the area around the battery, when the ambient temperature of the powertrain unit increases.

According to one aspect of the present disclosure, a battery temperature adjusting device for a vehicle on which a battery is mounted, is provided. The battery is a lithium ion battery disposed near a powertrain unit inside an engine bay. The device includes a first air duct provided to an intake passage configured to lead intake air to a combustion chamber of an engine, a second air duct provided to the intake passage and provided with an intake opening that opens toward a space between the powertrain unit and the battery, an intake-air-amount adjusting part configured to adjust a first intake air amount introduced from the first air duct and a second intake air amount introduced from the second air duct, and a controller configured to acquire an ambient temperature of the powertrain unit and control operation of the intake-air-amount adjusting part based on the ambient temperature. The controller increases a ratio of the second intake air amount relative to the sum of the first intake air amount and the second intake air amount, when the controller determines that the ambient temperature exceeds a first threshold temperature, compared with when the controller determines that the ambient temperature is below the first threshold temperature.

For example, when the vehicle is traveling, inside the engine bay, the ambient temperature of the powertrain unit becomes high due to exhaust heat from the powertrain unit including the engine, a transmission, etc. If the battery is disposed near the powertrain unit, the air increased in temperature due to the exhaust heat from the powertrain unit (i.e., heat) reaches the periphery of the battery, and the temperatures of the battery and its periphery may rise greatly, which leads to degradation of the battery. According to this configuration, the second air duct provided to the intake system is provided with the intake opening that opens toward the space between the powertrain unit and the battery. Thus, before the heat from the powertrain unit reaches the periphery of the battery, the heat is taken in into the intake passage through the intake opening and the second air duct, and thus removed. Accordingly, the temperature of the periphery of the battery can be suppressed from becoming high, the temperature of the battery can be maintained at the temperature suitable for excellent charge-and-discharge characteristics of the battery, and as a result, a longer battery life can be secured. Moreover, in this configuration, since the intake system of the engine is used as the device for removing the heat, it is not necessary to additionally provide a dedicated pump, etc. inside the engine bay, contributing to the downsizing of the engine bay, and as a result, of the vehicle. Note that the first threshold temperature is preferably 20° C. or higher and 50° C. or lower, from the viewpoint of suitably adjusting the temperatures of the battery and its periphery.

The battery may be disposed by the side of an upper part of the powertrain unit. The ambient temperature may be an ambient temperature of a lower part of the powertrain unit.

Into the engine bay, "traveling wind" (air) enters through a front grille, in general. The periphery of the upper part of the powertrain unit can be cooled by the traveling wind to some extent. On the other hand, at the periphery of the lower part of the powertrain unit, the cooling by the traveling wind may be insufficient. Then, heat from the lower part of the powertrain unit goes upward, and this heat may increase the temperatures of the battery and its periphery disposed the side of the upper part of the powertrain unit. According to this configuration, since the heat coming up from the lower part of the powertrain unit is removed before the heat reaches the periphery of the battery, the temperatures of the battery and its periphery can effectively be suppressed from becoming high.

The battery may be disposed above a transmission of the powertrain unit, and the intake opening may open toward a space between the transmission and the battery.

According to this configuration, since the heat came up from the transmission of the powertrain unit is removed before it reaches the periphery of the battery disposed above the transmission, the temperatures of the battery and its periphery can effectively be suppressed from becoming high.

The battery temperature adjusting device may further include a vehicle speed sensor connected to the controller and configured to detect a traveling speed of the vehicle, and a temperature sensor connected to the controller and configured to detect a water temperature and/or an oil temperature of the engine. The controller may estimate the ambient temperature based on the traveling speed and the water temperature and/or the oil temperature.

According to this configuration, since the estimation is based on the traveling speed and the water temperature and/or the oil temperature, the ambient temperature accurately reflecting the traveling state of the vehicle can be estimated, and the temperatures of the battery and its periphery can be controlled accurately. Moreover, the equipment already mounted on the vehicle can be used as the vehicle speed sensor and the temperature sensor so as to avoid the complicated configuration of the device and the cost increase.

The battery temperature adjusting device may further include an ambient temperature sensor connected to the controller and configured to detect the ambient temperature. The controller may control operation of the intake-air-amount adjusting part based on the ambient temperature detected by the ambient temperature sensor.

According to this configuration, by directly detecting the ambient temperature, the temperatures of the battery and its periphery can be controlled accurately.

The controller may increase an increasing rate of the ratio of the second intake air amount as the ambient temperature increases, when increasing the ratio of the second intake air amount.

According to this configuration, by increasing the increasing rate of the ratio of the second intake air amount as the ambient temperature increases, more heat is taken in from the second air duct so that the increase in the temperatures of the battery and its periphery can effectively be suppressed.

The battery temperature adjusting device may further include a vehicle speed sensor connected to the controller and configured to detect the traveling speed of the vehicle. The controller may increase an increasing rate of the ratio of the second intake air amount as the traveling speed decreases, when increasing the ratio of the second intake air amount.

In a case where the traveling speed is relatively high, a part of heat from the powertrain unit may be removed before reaching the battery by the traveling wind which entered into the engine bay. However, when the vehicle speed is slow, the effect of the traveling wind may be lowered. According to this configuration, by increasing the increasing rate of the ratio of the second intake air amount as the traveling speed decreases, the increase in the temperatures of the battery and its periphery can be suppressed.

The battery temperature adjusting device may further include an intake air cooling device disposed downstream of the second air duct in the intake passage and configured to cool intake air inside the intake passage. The controller may increase a degree of cooling of the intake air by the intake air cooling device, when increasing the ratio of the second intake air amount.

When the heat from the powertrain unit is led to the combustion chamber as it is as the intake air, there is a possibility that problems, such as an occurrence of knock and a drop in a charging efficiency may take place. According to this configuration, the intake air can be cooled by the intake air cooling device before being led to the combustion chamber to suppress the occurrence of knock and the drop in the charging efficiency.

The intake air cooling device may be a water-cooled intercooler built in the intake passage.

According to this configuration, since the water-cooled intercooler already mounted on the vehicle can be used as the intake air cooling device, the number of components inside the engine bay can be reduced and the intake air can efficiently be cooled.

The intake air cooling device may be a part of a refrigerant circuit of an air conditioning system mounted on the vehicle.

According to this configuration, since the air conditioning system already mounted on the vehicle can be used as the intake air cooling device, the number of components inside the engine bay can be reduced and the intake air can efficiently be cooled.

A minimum passage cross-sectional area of the first air duct may be larger than a minimum passage cross-sectional area of the second air duct. The intake-air-amount adjusting part may be an intake-air-amount adjusting valve provided to the first air duct side.

In this configuration, since the minimum passage cross-sectional area of the first air duct is larger than the minimum passage cross-sectional area of the second air duct, the first air duct is smaller in the intake drag or resistance than the second air duct. Therefore, when the intake-air-amount adjusting valve provided to the first air duct side is fully opened to increase the first intake air amount, the ratio of the second intake air amount relative to the sum of the first and second intake air amounts can indirectly be reduced. On the other hand, when the opening of the intake-air-amount adjusting valve is adjusted to reduce the first intake air amount, the ratio of the second intake air amount relative to the sum can indirectly be increased. Thus, only by adjusting the opening of the intake-air-amount adjusting valve provided on the first air duct side to adjust the first intake air amount, the ratio of the second intake air amount relative to the sum can be adjusted, and thus, the configuration of the device can be simplified.

The intake-air-amount adjusting part may include a first valve provided to the first air duct side and configured to adjust the first intake air amount, and a second valve provided to the second air duct side and configured to adjust the second intake air amount.

According to this configuration, the first intake air amount and the second intake air amount can be adjusted independently by the first valve and the second valve, and therefore, the ratio of the intake air amount can be controlled more accurately.

According to one aspect of the present disclosure, a battery temperature adjusting device for a vehicle on which a battery is mounted, is provided. The battery is a lithium ion battery disposed near a powertrain unit inside an engine bay. The device includes a first air duct provided to an intake passage configured to lead intake air to a combustion chamber of an engine, a second air duct provided to the intake passage and provided with an intake opening that opens toward a space between the powertrain unit and the battery, an intake-air-amount adjusting part configured to adjust a first intake air amount introduced from the first air duct and a second intake air amount introduced from the second air duct, and a controller configured to acquire an ambient temperature of the powertrain unit and control operation of the intake-air-amount adjusting part based on the ambient temperature. The controller includes an ambient temperature acquiring module, a determining module, memory, a calculating module, and a controlling module. The ambient temperature acquiring module acquires the ambient temperature. The determining module determines whether the ambient temperature exceeds a first threshold temperature. The memory stores a correlation between the ambient temperature and a ratio of the second intake air amount relative to the sum of the first intake air amount and the second intake air amount. The correlation is configured so that the ratio of the second intake air amount relative to the sum is increased when the ambient temperature exceeds the first threshold temperature, compared to when the ambient temperature is below the first threshold temperature. The calculating module calculates an increasing rate of the ratio of the second intake air amount based on the ambient temperature and the correlation, when it is determined that the ambient temperature exceeds the first threshold temperature. The controlling module controls operation of the intake-air-amount adjusting part based on the calculated increasing rate of the ratio of the second intake air amount.

According to this configuration, before the heat from the powertrain unit reaches the periphery of the battery, the heat is taken in into the intake passage through the intake opening and the second air duct, and thus removed. Accordingly, the temperature of the periphery of the battery can be suppressed from becoming high, and the temperatures of the battery can be maintained at the temperature suitable for excellent charge-and-discharge characteristics of the battery, and as a result, a longer battery life can be secured. Moreover, in this configuration, since the intake system of the engine is used as the device for removing the heat, it is not necessary to additionally provide a dedicated pump etc. inside the engine bay, and it can contribute to the downsizing of the engine bay, as a result, of the vehicle.

According to one aspect of the present disclosure, a vehicle provided with any one of the battery temperature adjusting devices described above is provided.

According to this configuration, by having the battery temperature adjusting device, the temperatures of the battery and its periphery can be maintained at the temperature suitable for charge-and-discharge characteristics of the battery, and as a result, a longer battery life can be secured.

When the ambient temperature is determined to be below the first threshold temperature, the controller may set the second intake air amount to a given value. When the ambient temperature is below the first threshold temperature, since it is considered that the temperatures of the battery and its periphery are within the suitable range, the second intake air amount is set to the given value, and maintaining the current temperatures is effective. Note that the given value is desirably 10% or less, and more preferably, 0%.

The first air duct may include, at an upstream end thereof, an additional intake opening which opens forward inside the engine bay. According to this configuration, external air introduced into the engine bay through a front grille etc. from the forward of the vehicle, can be taken in into the intake passage efficiently. Moreover, the intake air from the first air duct and the intake air from the second air duct are mixed to suppress the excessive increase in the temperature of the intake air.

The vehicle may be provided with an adiabatic wall disposed between the upper part of the powertrain unit and the battery. According to this configuration, the excessive increase in the temperatures of the battery and its periphery can be suppressed.

The intake passage may be provided with an air cleaner, and the downstream side of the first air duct and the downstream side of the second air duct may communicate with the air cleaner. According to this configuration, foreign materials, such as dust, contained in intake air from the first and second air ducts can be removed.

According to one aspect of the present disclosure, a method of adjusting a battery temperature of a vehicle on which a battery is mounted, is provided. The battery is a lithium ion battery disposed near a powertrain unit in an engine bay. The vehicle includes a first air duct provided to an intake passage configured to lead intake air to a combustion chamber of an engine, a second air duct provided to the intake passage and provided with an intake opening that opens toward a space between the powertrain unit and the battery, and an intake-air-amount adjusting part configured to adjust a first intake air amount introduced from the first air duct and a second intake air amount introduced from the second air duct. The method includes acquiring an ambient temperature of the powertrain unit by one of an estimation and a detection, determining whether the ambient temperature exceeds a first threshold temperature, and increasing a ratio of the second intake air amount relative to the sum of the first intake air amount and the second intake air amount, when the ambient temperature is determined to exceed the first threshold temperature, compared with when the ambient temperature is determined to be below the first threshold temperature, by controlling operation of the intake-air-amount adjusting part.

According to this configuration, before the heat from the powertrain unit reaches the periphery of the battery, the heat is taken in into the intake passage through the intake opening and the second air duct, and thus removed. Accordingly, the temperatures of the battery and its periphery can be suppressed from becoming high, and the temperature of the battery can be maintained at the temperature suitable for excellent charge-and-discharge characteristics of the battery, and as a result, a longer battery life can be secured. Moreover, in this configuration, since the intake system of the engine is used as the device for removing the heat, it is not necessary to additionally provide a dedicated pump, etc. inside the engine bay, and it can contribute to the downsizing of the engine bay, as a result, of the vehicle.

DETAILED DESCRIPTION OF THE DISCLOSURE

Hereinafter, several embodiments of the present disclosure will be described in detail with reference to the accompanying drawings. The following description of desirable embodiments is merely illustration, and it is not intended to limit the present disclosure, its application object, and its usage.

Embodiment 1

Vehicle

Figure 1:
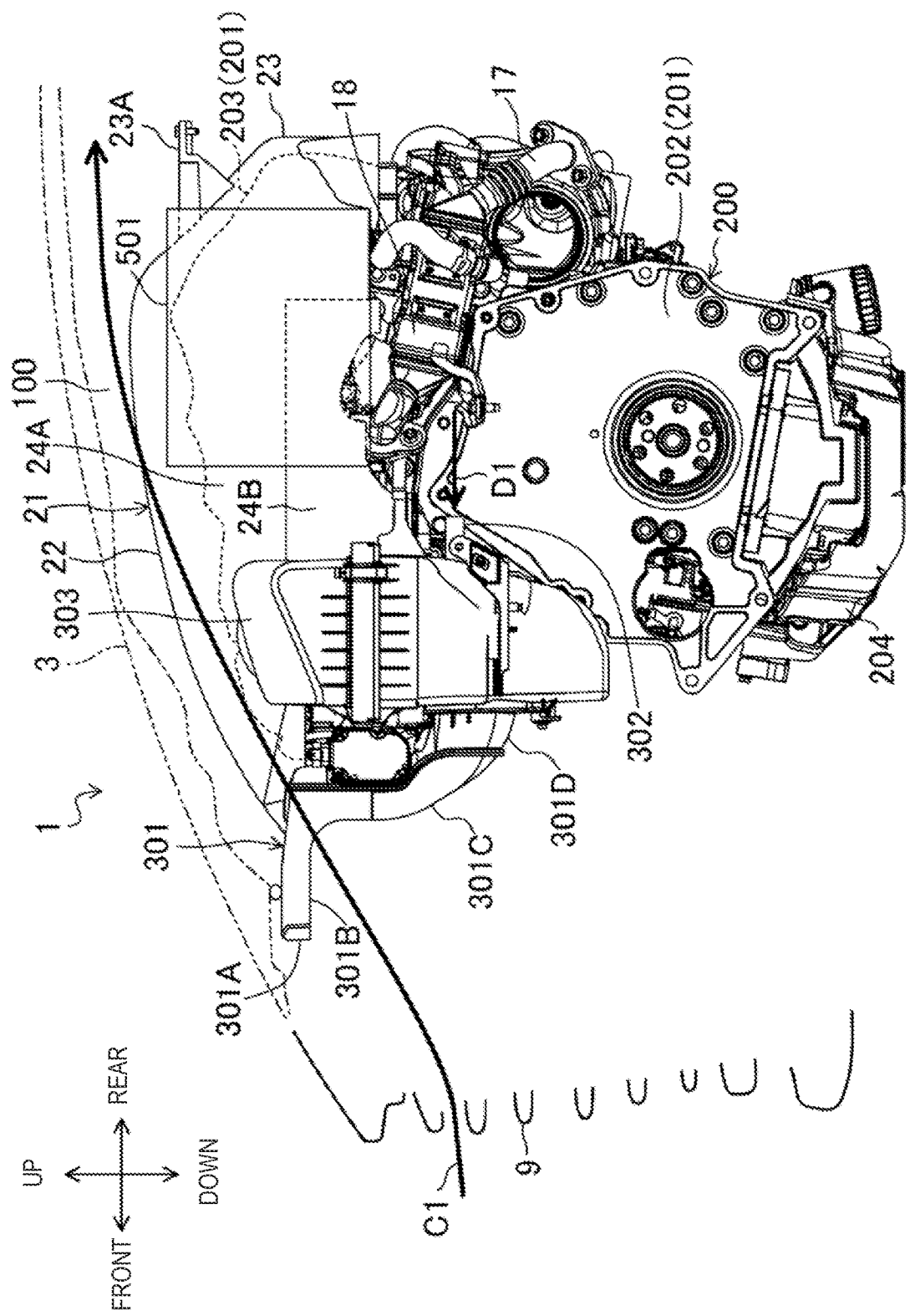
FIG. 1 is a left side view illustrating the inside of an engine bay of a vehicle according to Embodiment 1, where illustration of a transmission is omitted.

FIGS. 1 to 5 illustrate the inside of an engine bay 100 of a vehicle 1 according to one embodiment. As illustrated in FIG. 1, the engine bay 100 is provided as a concave part which opens upwardly in a front part of the vehicle 1, and accommodates a powertrain unit 200 and its peripheral apparatuses. The upper opening of the engine bay 100 is covered with an engine hood 3. Since the hood 3 can be opened and closed freely, the inside of the engine bay 100 can be checked from outside of the vehicle by opening the hood 3, if needed.

Note that hereinafter, "the inside of the engine bay 100" is also referred to as "inside the engine bay 100," and it is a space defined when the hood 3 is closed and the upper opening of the engine bay 100 is covered. Hereinafter, a direction of the vehicle 1 moving forward and rearward (reverse) is referred to as a "front-and-rear direction," where the forward side is referred to as a "front side," and the reverse side is referred to as a "rear side." Moreover, a vehicle width direction is referred to as a "left-and-right direction." Note that "right side" and "left side" are used when the vehicle is seen from the rear. Moreover, an up-and-down direction of the vehicle 1 is referred to as an "up-and-down direction." Moreover, when referring to an intake passage, upstream and downstream in an intake-air flow direction may be referred to as an "upstream" and a "downstream," respectively.

Figure 2:
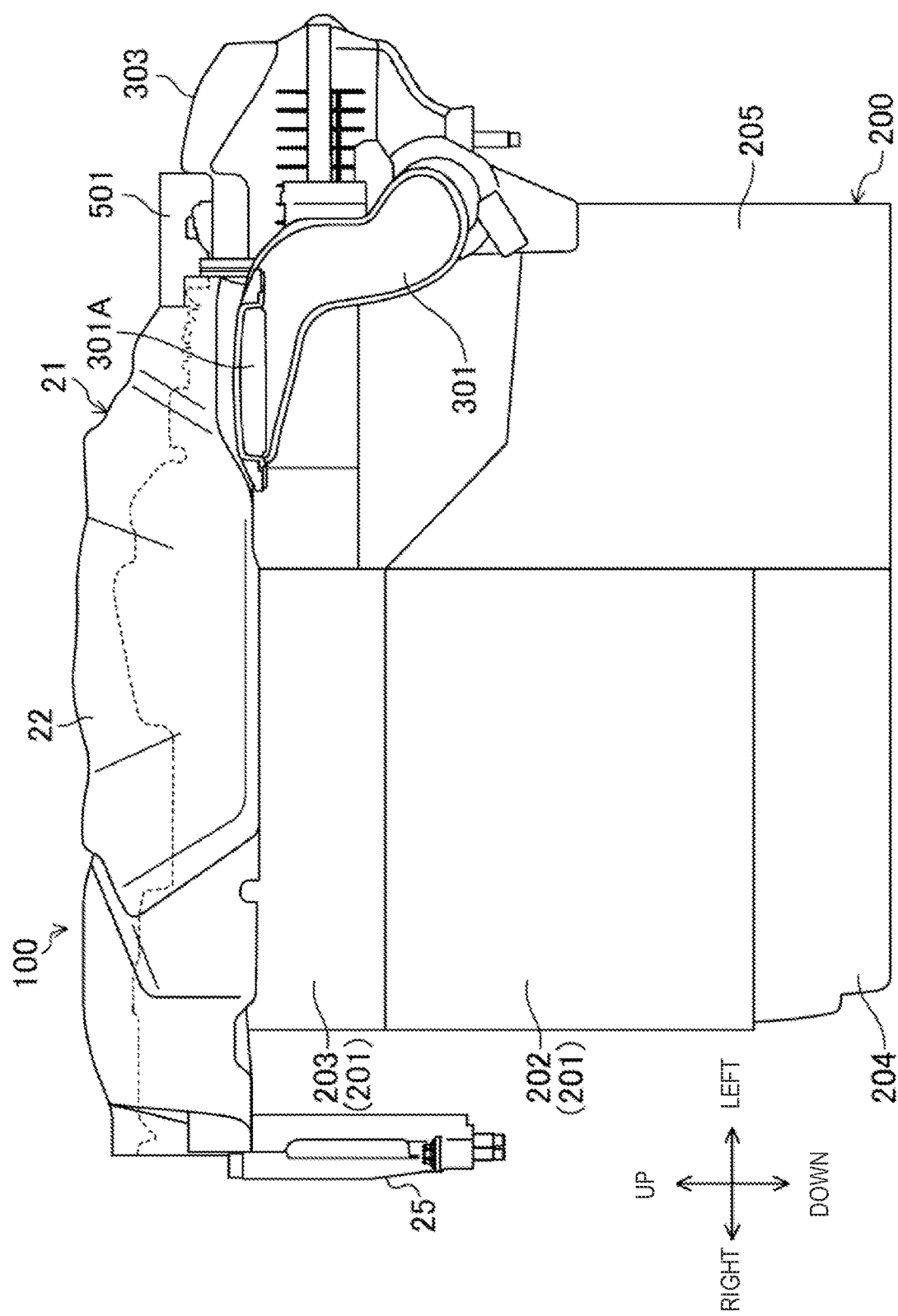
FIG. 2 is a view illustrating the inside of the engine bay of the vehicle of FIG. 1, seen from the front.

As illustrated in FIG. 2, the powertrain unit 200 includes an engine 201, an oil pan 204, and a transmission 205. The engine 201 includes a cylinder block 202 and a cylinder head 203 placed on the cylinder block 202. The oil pan 204 is fixed to a lower surface of the cylinder block 202. The transmission 205 is disposed adjacent to the cylinder block 202 and the oil pan 204.

Although not illustrated, a plurality of cylinders are formed inside the cylinder block 202. That is, the engine 201 is a multi-cylinder engine. A piston is slidably inserted into each cylinder. The piston is coupled to a crankshaft via a connecting rod. The piston, the cylinder, and the cylinder head 203 define a combustion chamber of the engine 201.

Note that hereinafter, "an upper part of the powertrain unit 200" is referred to as the cylinder head 203. Moreover, "a lower part of the powertrain unit 200" is referred to as the cylinder block 202, the oil pan 204, and the transmission 205.

The powertrain unit 200 includes a part of intake system components and exhaust system components of the engine 201. The intake system components are disposed forward of the engine 201, and the exhaust system components are disposed rearward of the engine 201. That is, the engine 201 is a front-intake and rear-exhaust type.

Intake Passage

Figure 6:
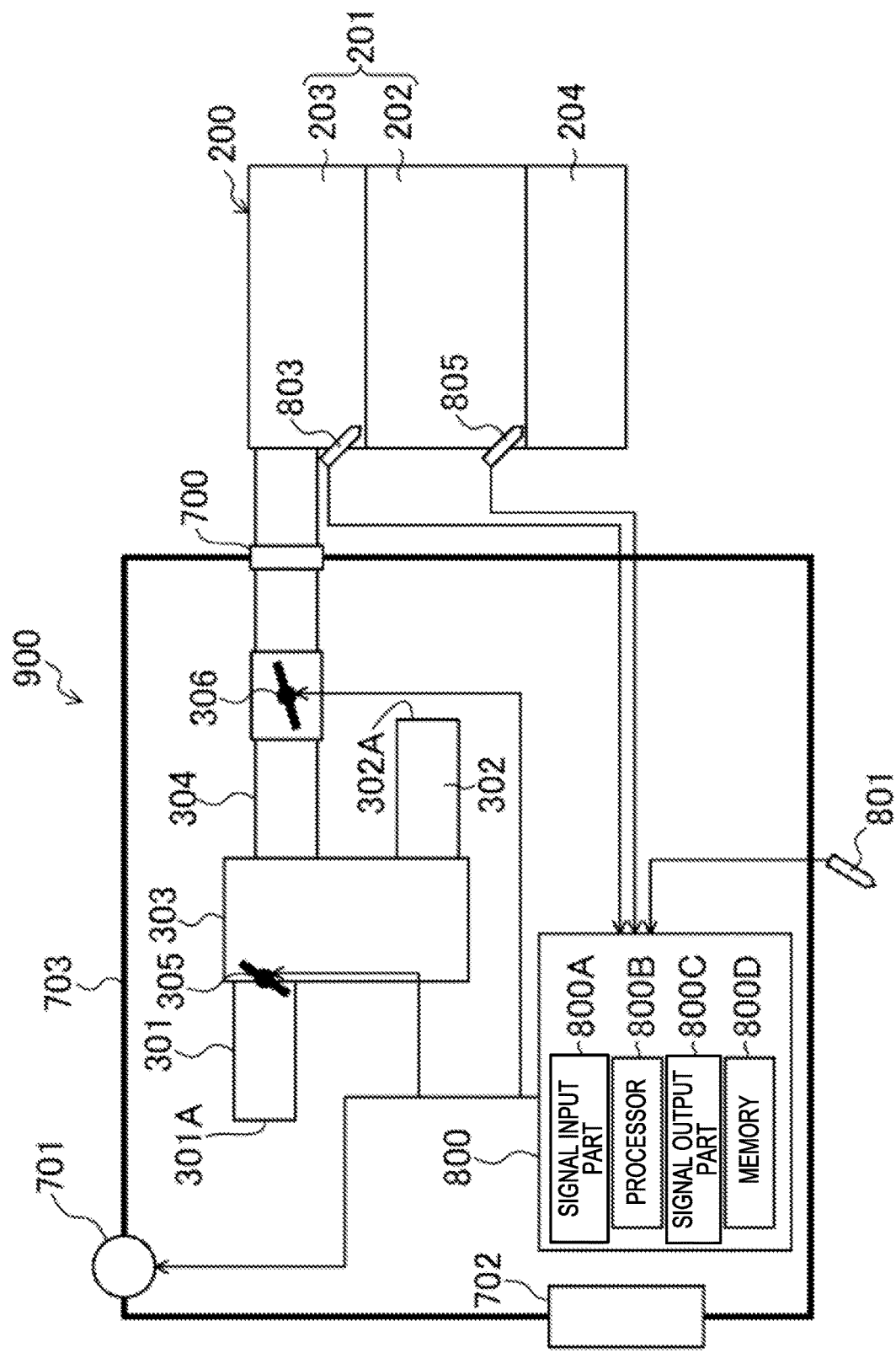
FIG. 6 is a view illustrating a configuration of a battery temperature adjusting device according to Embodiment 1.

As illustrated in FIGS. 1 and 6, an intake system of the engine 201 is comprised of the intake system components, such as a first air duct 301, a second air duct 302, an air cleaner 303, an intake pipe 304, a supercharger, a water-cooled intercooler 700 (intake air cooling device), and an intake manifold including a surge tank. The intake manifold is provided with a plurality of independent passages corresponding to the cylinders, and these independent passages are connected to a plurality of intake ports which extend to the combustion chambers inside the cylinder head 203. That is, these intake system components and the intake ports constitute an intake passage which leads intake air to the combustion chambers.

Air inside the engine bay 100 is introduced into the air cleaner 303 through the first air duct 301 and the second air duct 302. The air cleaner 303 is an instrument which removes foreign materials, such as dust, contained in intake air introduced into the combustion chambers. The intake air is introduced into the supercharger from the air cleaner 303 through the intake pipe 304 provided with a throttle valve 306 (see FIG. 6). The supercharger boosts the pressure of intake air introduced into the combustion chambers. The supercharger is, for example, a mechanical supercharger which is driven by the crankshaft of the engine 201 through a belt. Note that the supercharger may be an electric supercharger, or a turbocharger which is driven by exhaust-gas energy. The intake air which passed through the supercharger is cooled by the water-cooled intercooler 700, and is then introduced into the combustion chamber of each cylinder through the surge tank. Note that the intake pipe 304 is also provided with a by-pass pipe which is connected to the surge tank while bypassing the supercharger. The by-pass pipe is provided with a by-pass valve which adjusts an opening area of the pipe. An exhaust gas recirculation (EGR) pipe 17 (see FIG. 1) which recirculates a portion of exhaust gas to the combustion chambers as EGR gas is connected to a part of the by-pass pipe upstream of the by-pass valve. The EGR pipe 17 is provided with an EGR cooler 18 (see FIG. 1) which cools the EGR gas.

First and Second Air Ducts

As illustrated in FIGS. 1 and 2, the first air duct 301 includes a first intake opening 301A (additional intake opening) provided at an upstream end thereof. Note that in this embodiment, although the shape of the first intake opening 301A is a laterally elongated rectangular shape, it is not limited in particular and may be a circular, elliptical, or polygonal shape. As illustrated in FIG. 1, the first intake opening 301A opens forward inside the engine bay 100. Moreover, the downstream side of the first air duct 301 communicates with the air cleaner 303. The first air duct 301 is comprised of an upper part 301B extending substantially horizontally to the rear from the first intake opening 301A, an intermediate part 301C extending downwardly continuously from the upper part 301B, and a lower part 301D extending rearwardly continuously from the intermediate part 301C and connected to the air cleaner 303. Note that the shape of the first air duct 301 is not limited to the above shape.

Figure 5:
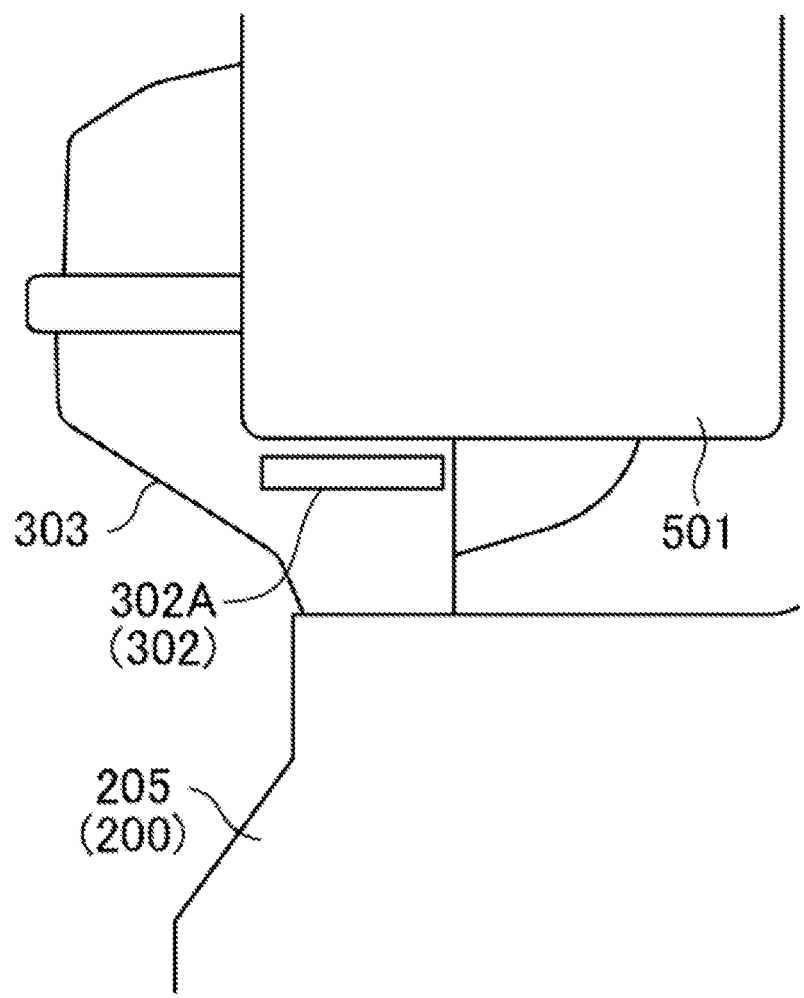
FIG. 5 is a view illustrating near an air cleaner of FIG. 2, seen from the rear.

As illustrated in FIG. 5, the second air duct 302 is provided with a second intake opening 302A (intake opening) having a laterally elongated, substantially rectangular shape provided to the upstream end thereof. The second intake opening 302A opens toward a space between the transmission 205 and a battery 501 (described later). Moreover, as illustrated in FIGS. 1 and 6, the downstream side of the second air duct 302 communicates with the air cleaner 303. As illustrated in FIGS. 1 and 5, the second air duct 302 has a pipe shape with a laterally elongated, substantially rectangular shape in the cross section as a whole, and extends substantially horizontally toward the space between the transmission 205 and the battery 501 from a lower part of the air cleaner 303. Although the shapes of the second intake opening 302A and the second air duct 302 are not limited to the above shapes in particular, if the second intake opening 302A is laterally elongated, it can take in air between the transmission 205 and the battery 501 broadly in the left-and-right direction.

In this embodiment, the minimum passage cross-sectional area of the first air duct 301 is larger than the minimum passage cross-sectional area of the second air duct 302. That is, the intake resistance of the first air duct 301 is smaller than the intake resistance of the second air duct. In this case, if both the first air duct 301 and the second air duct 302 are fully opened, the air is taken in into the air cleaner 303 through the first air duct 301 with the smaller intake resistance.

Insulation Cover

As illustrated in FIGS. 1 to 4, the upper part of the powertrain unit 200 is covered with an insulation cover 21. That is, the insulation cover 21 covers the cylinder head 203 from above and surrounds the circumference of the upper part of the cylinder head 203.

Concretely, the insulation cover 21 includes an upper surface covering part 22 which covers the engine 201 from above, and a rear surface covering part 23 which continues from the upper surface covering part 22 and covers an upper part of the engine 201 from the rear. Moreover, the insulation cover 21 also includes a left surface covering part 24 (adiabatic wall) which continues from the upper surface covering part 22 and covers the upper part of the engine 201 from the left, and a right surface covering part 25 which continues from the upper surface covering part 22 and covers the upper part of the engine 201 from the right. The rear surface covering part 23 is provided with a bracket 23A which protrudes rearwardly. The insulation cover 21 is fixed to a cowl panel or a windshield panel of the vehicle 1 with the bracket 23A.

As illustrated by an arrow C1 in FIG. 1, "traveling wind" (air) enters the engine bay 100 through a front grille 9 at the front end of the vehicle 1 while traveling. If the cylinder head 203 of the engine 201 is exposed to extremely-cold traveling wind, or a large amount of extremely-cold air is led to the combustion chambers during lean combustion, the temperature of the combustion chambers drops largely, and therefore, the combustion stability of the engine 201 is impaired. The insulation cover 21 is to store the heat radiated from the engine 201 therein by using air as a medium. Thus, the insulation cover 21 interrupts the heat dissipation from the upper part of the engine 201 to above and to the side. This suppresses the extreme temperature lowering of the upper part of the engine 201 (i.e., the combustion chambers) to secure the sufficient combustion stability of the engine.

Figure 3:
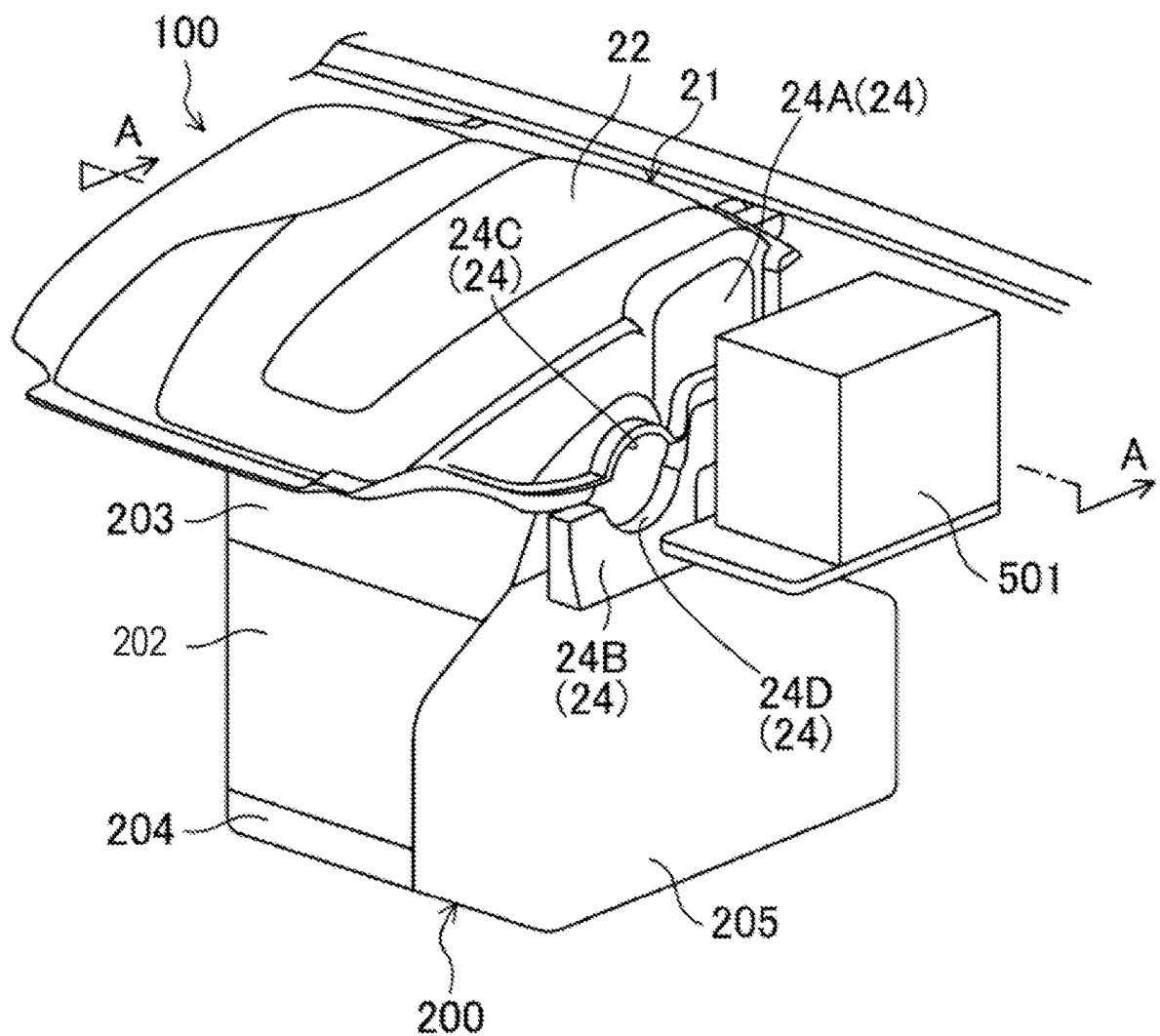
FIG. 3 is a perspective view illustrating the inside of the engine bay of FIG. 2, seen from the front and the left, where illustration of intake system components is omitted.
Figure 4:
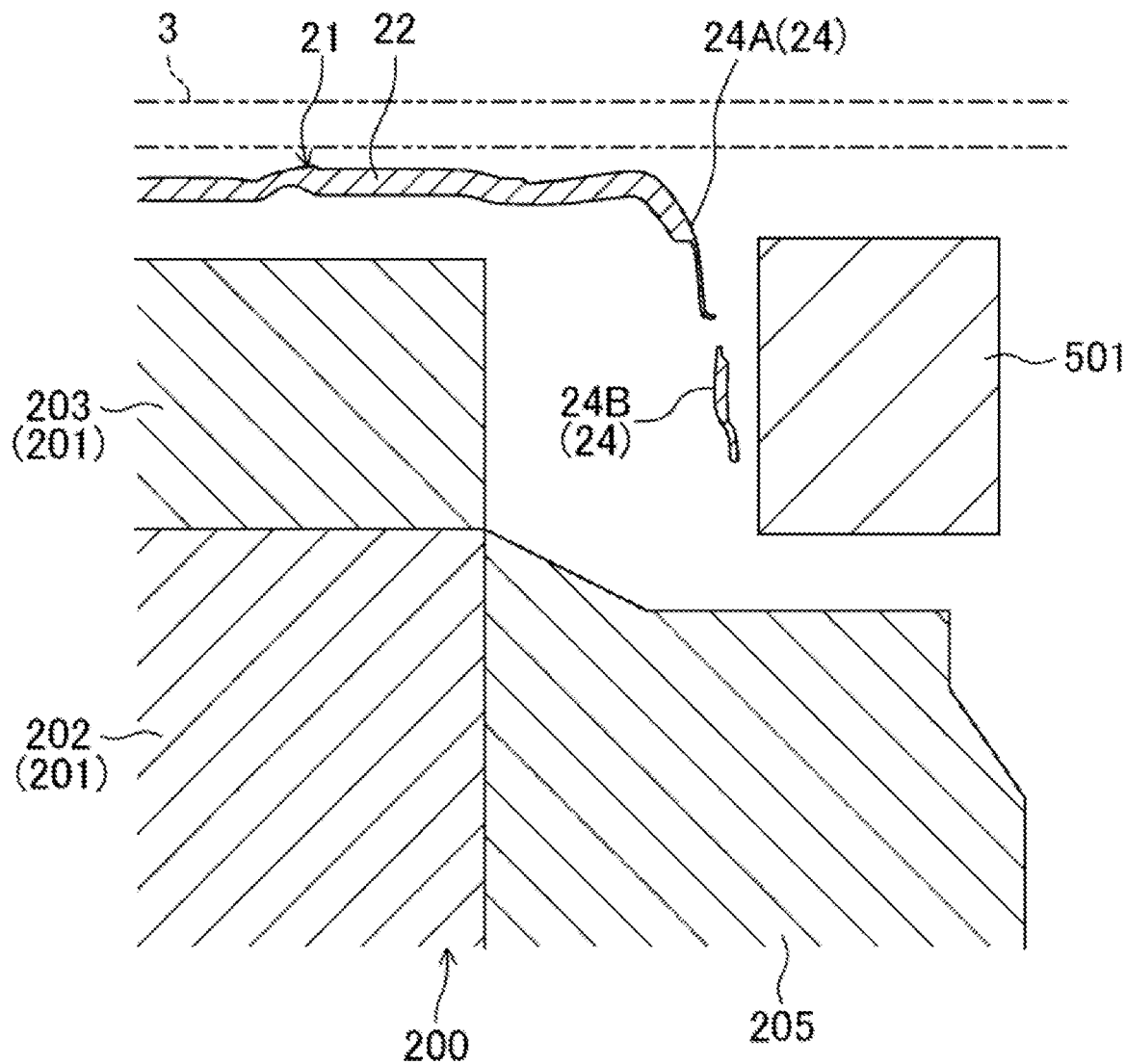
FIG. 4 is a cross-sectional view taken along a line A-A of FIG. 3.

Note that as illustrated in FIGS. 1, 3, and 4, the left surface covering part 24 is disposed between a left surface of the upper part of the cylinder head 203 and the battery 501. In detail, the left surface covering part 24 includes an upper wall part 24A which continues from a left edge of the upper surface covering part 22, and a lower wall part 24B connected to the upper wall part 24A through a sealant (not illustrated). A part of the upper wall part 24A and a part of the lower wall part 24B are disposed between the left surface of the upper part of the cylinder head 203 and the battery 501.

Note that notches 24C and 24D having a semicircular shape which face each other from above and below are formed in a lower edge of the upper wall part 24A and an upper edge of the lower wall part 24B of the left surface covering part 24. These notches 24C and 24D form a hole through which a flexible pipe (not illustrated) which extends toward the engine 201 from the air cleaner 303 and connects the air cleaner 303 with the intake pipe 304.

Various Sensors

Vehicle Speed Sensor

The vehicle 1 is provided with a vehicle speed sensor 801 which detects a speed of the vehicle 1 (see FIG. 6). Although it is not intended to limit, the vehicle speed sensor 801 is connected to an output shaft of the transmission 205, for example.

Water Temperature Sensor and Oil Temperature Sensor

A water temperature sensor 803 which detects water temperature of the engine 201 is provided, for example, on a coolant passage of the engine 201 (in detail, near an outlet of the coolant passage of the cylinder head 203) (see FIG. 6). Moreover, an oil temperature sensor 805 which detects oil temperature is provided, for example, on an oil passage of the engine 201 (in detail, near an entrance of a main gallery of the cylinder block 202) (see FIG. 6). Note that the mounting positions of the water temperature sensor 803 and the oil temperature sensor 805 are not limited to the mounting positions described above, as long as they are on the coolant passage and the oil passage, respectively.

Battery and Battery Temperature Adjusting Device

The vehicle 1 according to this embodiment includes the battery 501 and a battery temperature adjusting device 900 which adjusts the temperatures of the battery 501 and its periphery.

Battery

The battery 501 is mounted inside the engine bay 100 mainly for the purposes of supplying power to a starter motor when starting the engine, and supplying power to lighting inside a cabin and audiovisual apparatuses when they are used while the engine is stopped.

As illustrated in FIGS. 1 to 5, the battery 501 is disposed near the powertrain unit 200 inside the engine bay 100 (i.e., within a range where the heat from the powertrain unit 200 may reach). In detail, the battery 501 is disposed above the transmission 205 and at left side of the cylinder head 203, through the left surface covering part 24.

The battery 501 is a lithium ion battery. The lithium ion battery is, for example, a lithium ion battery (e.g., cobalt, manganese, olivine, ternary, and titanic acid), or a lithium polymer battery. The lithium ion battery demonstrates the best charge-and-discharge characteristics within a temperature range of about 25° C. to 40° C. In other words, if the temperature of the battery 501 deviates from this temperature range, sufficient charge-and-discharge characteristics cannot be obtained, and this may become a cause of early deterioration. Therefore, it is important in extending the life of the battery 501 to maintain the temperature of the battery 501 and the temperature of its periphery within the temperature range.

Battery Temperature Adjusting Device

FIG. 6 illustrates a configuration of the battery temperature adjusting device 900 according to this embodiment. Note that in FIG. 6, in order to facilitate understandings, illustration of components, such as a flexible pipe which connects the air cleaner 303 with the intake pipe 304, is omitted.

The battery temperature adjusting device 900 includes the first air duct 301, the second air duct 302, an intake-air-amount adjusting valve 305 (intake-air-amount adjusting part), the water-cooled intercooler 700, and a controller 800.

Intake-Air-Amount Adjusting Valve

The intake-air-amount adjusting valve 305 is provided on the first air duct 301 side (e.g., at a connecting part of the downstream end of the first air duct 301 with the air cleaner 303). The intake-air-amount adjusting valve 305 is a valve which adjusts an amount of intake air taken into the air cleaner 303 from the first air duct 301 (i.e., a first intake air amount). Although it is not intended to limit, the intake-air-amount adjusting valve 305 may be a flow control valve (e.g., a rotary valve, such as a butterfly valve and a flap valve).

Here, as described above, the first air duct 301 is smaller in the intake drag or resistance than the second air duct 302. Therefore, when the intake-air-amount adjusting valve 305 is fully opened to maximize the first intake air amount, an amount of intake air introduced from the second air duct 302 (i.e., a second intake air amount) can be suppressed. On the other hand, when the opening of the intake-air-amount adjusting valve 305 is adjusted to reduce the first intake air amount, the second intake air amount can be increased. Thus, only by adjusting the opening of the intake-air-amount adjusting valve 305 provided on the first air duct 301 side to adjust the first intake air amount, the entire volume of intake air introduced into the air cleaner 303 (i.e., a ratio of the first intake air amount and a ratio of the second intake air amount relative to the total intake air amount) can be adjusted. Therefore, the configuration of the device can be simplified.

Note that the intake-air-amount adjusting valve 305 may be provided on the second air duct 302 side (e.g., at a connecting part of the downstream end of the second air duct 302 with the air cleaner 303). In this case, by adjusting the second intake air amount by using the intake-air-amount adjusting valve 305, the ratio of the first intake air amount and the ratio of the second intake air amount relative to the total amount of intake air introduced into the air cleaner 303 can also be adjusted.

Water-Cooled Intercooler

The water-cooled intercooler 700 is disposed in the intake passage, downstream of the supercharger and upstream of the surge tank as described above, and cools the entire intake air which passed through the supercharger.

The water-cooled intercooler 700 includes a coolant passage 703, an electric water pump 701, and a low-temperature radiator 702. By the actuation of the electric water pump 701, the coolant flows through the coolant passage 703. The coolant is cooled by the low-temperature radiator 702 to a temperature below the engine coolant temperature. Thus, the intake air inside the intake passage is cooled.

Since the water-cooled intercooler 700 is the intake air cooling device already built inside the intake passage, it can cool the intake air efficiently, without increasing the number of components inside the engine bay 100.

Controller

The controller 800 is a control device based on a well-known microcomputer. As illustrated in FIG. 6, the controller 800 is provided with a signal input part 800A which is connected to the various sensors, such as the vehicle speed sensor 801, the water temperature sensor 803, the oil temperature sensor 805, and an accelerator opening sensor (not illustrated), and accepts inputs of the detection signals from the various sensors. Moreover, the controller 800 is provided with a processor 800B (an ambient temperature acquiring module, a determining module, a calculating module) which performs calculation processings according to the control. Moreover, the controller 800 is provided with a signal output part 800C (controlling module) which is connected to controlled targets, such as the intake-air-amount adjusting valve 305, the throttle valve 306, and the electric water pump 701, and outputs control signals to the controlled targets. Moreover, the controller 800 is provided with a memory 800D which stores a program and data necessary for the control. Note that the controller 800 may be electrically connected or may be wirelessly connected to the various sensors and the controlled targets.

In detail, the controller 800 outputs the control signal to a drive motor of the intake-air-amount adjusting valve 305, and controls actuation (i.e., the opening) of the intake-air-amount adjusting valve 305. Thus, the controller 800 controls a flow rate of intake air passing through the intake-air-amount adjusting valve 305 to control the ratio of the first intake air amount and the ratio of the second intake air amount relative to the total intake air amount.

Moreover, the controller 800 outputs the control signal to a drive motor of the throttle valve 306 based on a detection signal from the accelerator opening sensor to control actuation (i.e., the opening) of the throttle valve 306. Thus, the controller 800 controls a flow rate of intake air passing through the intake pipe 304 (i.e., the total intake air amount which is the sum of the first intake air amount and the second intake air amount).

Moreover, the controller 800 also outputs the control signal to a drive motor of the electric water pump 701 to control actuation of the electric water pump 701 (i.e., a discharge pressure of the coolant). Thus, a degree of cooling the intake air downstream of the throttle valve 306 is controlled.

Method of Adjusting Battery Temperature

Figure 7:
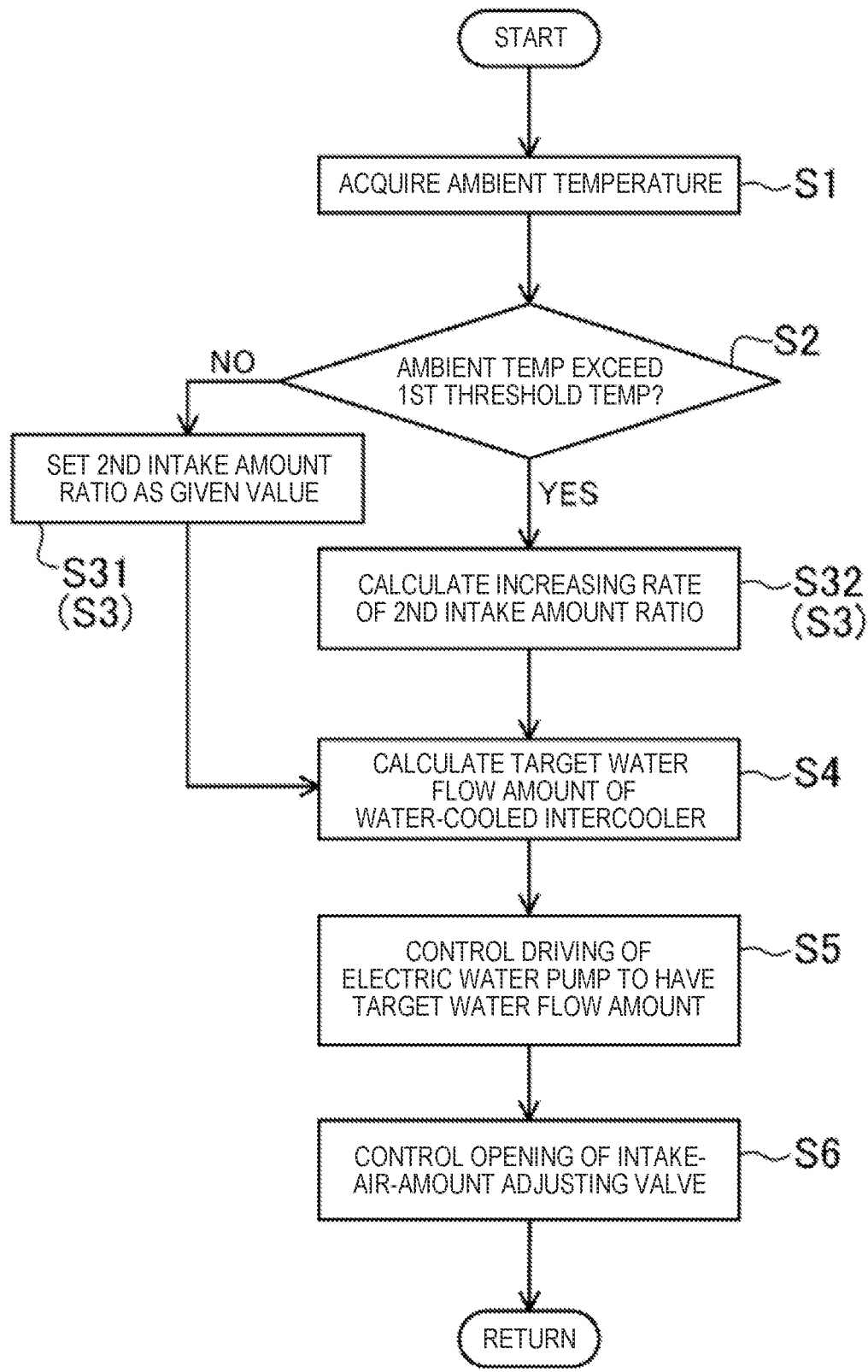
FIG. 7 is a flowchart illustrating a method of adjusting a battery temperature according to Embodiment 1.

One example of the method of adjusting a battery temperature using the battery temperature adjusting device 900 according to this embodiment is described below with reference to FIGS. 6 to 8.

The method of adjusting the battery temperature includes an ambient temperature acquiring step S1, a temperature determining step S2, a second intake-air-amount ratio calculating step S3, a target water flow amount calculating step S4, an electric water pump controlling step S5, and an intake-air-amount controlling step S6.

Ambient Temperature Acquiring Step

The memory 800D of the controller 800 stores in advance a correlation between the vehicle speed (traveling speed of the vehicle) and the water temperature and/or the oil temperature, and the ambient temperature of the powertrain unit 200 (especially, the ambient temperature of the lower part of the powertrain unit 200), as a map.

At the ambient temperature acquiring step S1, the controller 800 acquires, by the signal input part 800A, the current vehicle speed detected by the vehicle speed sensor 801, and the current water temperature and/or the current oil temperature which are detected by the water temperature sensor 803 and/or the oil temperature sensor 805, respectively. Then, the processor 800B estimates the ambient temperature of the powertrain unit 200 (especially, the ambient temperature of the lower part of the powertrain unit 200) based on the vehicle speed and the water temperature and/or the oil temperature, and the map. In this way, the controller 800 acquires the ambient temperature as an estimated value.

Note that the map is desirable to be configured so that the ambient temperature becomes higher as the vehicle speed decreases. When the vehicle speed is fast to some extent, a part of heat from the powertrain unit 200 may be removed before reaching the battery 501 by the traveling wind which entered into the engine bay 100 through the front grille 9, as illustrated by the arrow C1 in FIG. 1. However, when the vehicle speed is slow, the effect of the traveling wind may be lowered. In such a case, it is necessary to more positively remove the heat from the lower part of the powertrain unit 200 by increasing the second intake air amount. Therefore, by configuring the map so that the ambient temperature becomes higher as the vehicle speed decreases, the ratio of the second intake air amount at the second intake-air-amount ratio calculating step S3 (described later) can be increased, and therefore, the temperatures of the battery 501 and its periphery can be maintained within the suitable range.

Temperature Determining Step

At the temperature determining step S2, the processor 800B of the controller 800 determines whether the ambient temperature estimated at the ambient temperature acquiring step S1 exceeds a first threshold temperature.

The first threshold temperature is preferably 20° C. or higher and 50° C. or lower, from the viewpoint of maintaining the temperatures of the battery 501 and its periphery from about 25° C. to about 40° C.

Second Intake-Air-Amount Ratio Calculating Step

The memory 800D of the controller 800 stores a correlation between the ambient temperature and the ratios of the first intake air amount and the second intake air amount, which are obtained tentatively in advance, as a map. Note that this map is configured so that the ratio of the second intake air amount becomes a given value when the ambient temperature is below the first threshold temperature. Moreover, this map is configured so that the ratio of the second intake air amount increases as compared with a case where the ambient temperature is below the first threshold temperature, when the ambient temperature exceeds the first threshold temperature. In other words, the map is configured so that the ratio of the second intake air amount increases from the given value, when the ambient temperature exceeds the first threshold temperature.

At the second intake-air-amount ratio calculating step S3, the processor 800B calculates an increasing rate of the ratio of the second intake air amount based on the estimated ambient temperature and the map.

Concretely, if the ambient temperature is determined to be below the first threshold temperature, the ratio of the second intake air amount is set as the given value (Step S31). If the ambient temperature is below the first threshold temperature, since the exhaust heat from the lower part of the powertrain unit 200 is small, it is desirable to minimize the intake air from the second air duct 302. That is, the given value is desirably be 10% or less (more preferably, 0%). Note that the given value may be or may not be a constant value. In detail, the given value may be a variable value which periodically changes between 0% and 10%.

On the other hand, if the ambient temperature is determined to exceed the first threshold temperature, the increasing rate of the ratio of the second intake air amount is calculated so that the ratio of the second intake air amount increases from the given value (Step S32). In detail, for example, if the given value in case where the ambient temperature is below the first threshold temperature is set as 10%, and when the ambient temperature is determined to exceed the first threshold temperature, the ratio of the second intake air amount may be calculated as a value larger than 10% (e.g., 20%) (here, the increasing rate is 10%).

Note that the map is configured so that the increasing rate of the ratio of the second intake air amount becomes larger as the estimated ambient temperature increases. In detail, it is assumed that, for example, the given value of the ratio of the second intake air amount in case where the first threshold temperature is 50° C. and the ambient temperature is below the first threshold temperature (50° C.) is set as 10%. Here, for example, if the ambient temperature is 60° C., the ratio of the second intake air amount may be calculated as 20% (the increasing rate is 10%), and if the ambient temperature is 70° C., the ratio of the second intake air amount may be calculated as 30% (the increasing rate is 20%). Further, especially, since the ambient temperature is estimated to be higher as the vehicle speed decreases, the increasing rate of the ratio of the second intake air amount increases as the vehicle speed decreases, even if the water temperature and/or the oil temperature stays the same.

Target Water Flow Amount Calculating Step

When the air which became hot by the exhaust heat from the powertrain unit 200 is led to the combustion chamber as it is as the intake air, there is a possibility that problems, such as an occurrence of knock and a drop in the charging efficiency may take place. Therefore, the water-cooled intercooler 700 cools the intake air to suppress the occurrence of knock and the drop in the charging efficiency.

The memory 800D of the controller 800 stores, for example, a relation between the temperature of the intake air introduced into the water-cooled intercooler 700 and the target water flow amount required for cooling the intake air (i.e., a discharging amount of the coolant by the electric water pump 701), as a map.

At the target water flow amount calculating step S4, the processor 800B of the controller 800 first calculates the temperature of the intake air. The temperature of the intake air is calculated based on the temperature of the intake air from the first air duct 301, the ratio of the first intake air amount, the ambient temperature, and the ratio of the second intake air amount calculated at the second intake-air-amount ratio calculating step S3. Then, the processor 800B calculates the target water flow amount based on the calculated temperature of the intake air, and the map.

Note that, the map is set so that the target water flow amount increases as the ratio of the second intake air amount increases. Therefore, the degree of cooling the intake air by the water-cooled intercooler 700 can be increased as the temperature of the intake air increases to effectively suppress the occurrence of knock and the drop in the charging efficiency.

Electric Water Pump Controlling Step

The control signal is outputted from the signal output part 800C of the controller 800 to the electric water pump 701 so that the water flow amount of the water-cooled intercooler 700 becomes the target water flow amount calculated at the target water flow amount calculating step S4. Thus, the discharging amount of the coolant by the electric water pump 701 is adjusted.

Intake-Air-Amount Controlling Step

The control signal is outputted from the signal output part 800C of the controller 800 to the intake-air-amount adjusting valve 305 so as to obtain the second intake air amount calculated at the second intake-air-amount ratio calculating step S3. Thus, the opening of the intake-air-amount adjusting valve 305 is adjusted, and thereby adjusting the ratio of the first intake air amount and the second intake air amount.

EXAMPLES

Figure 8:
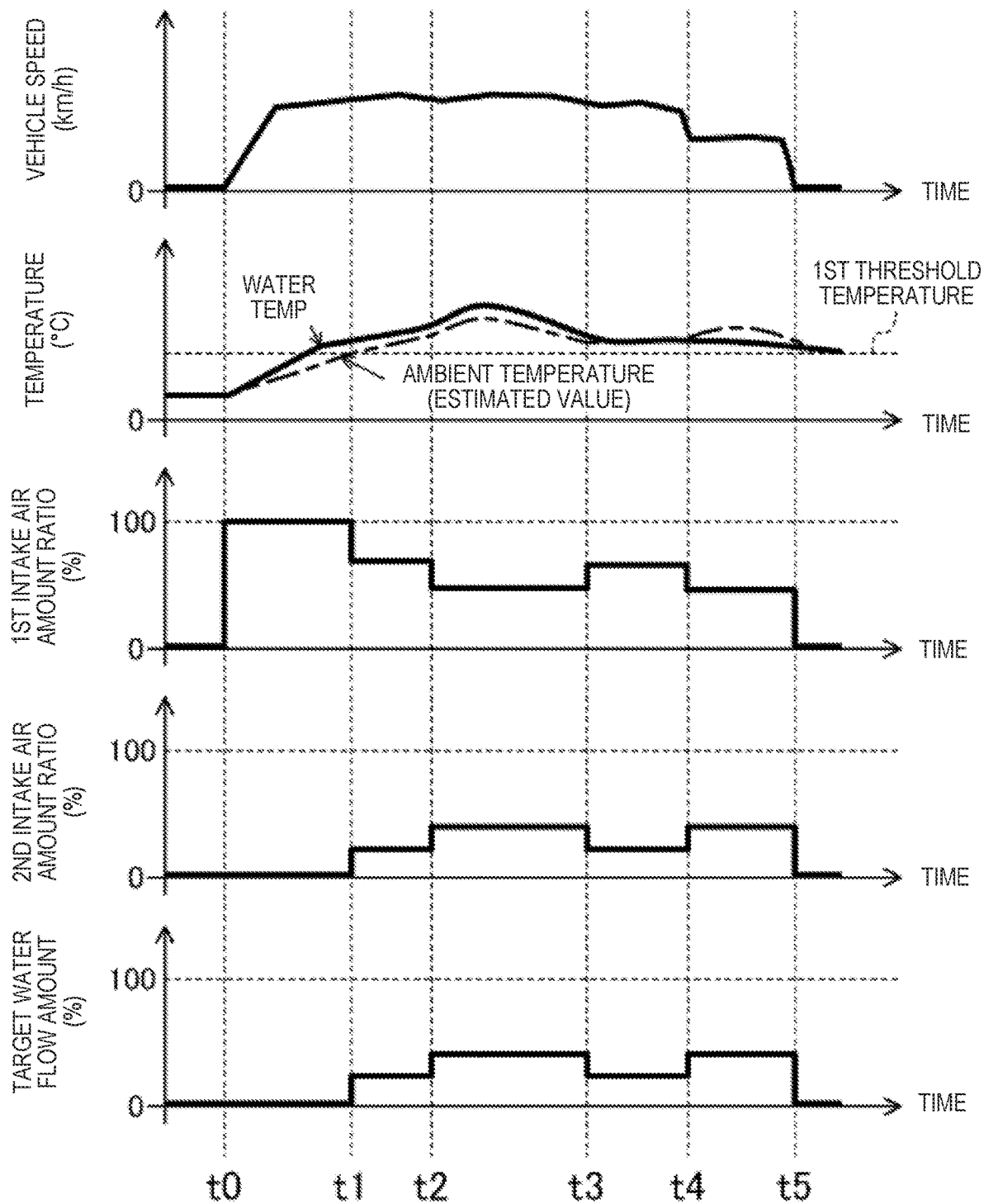
FIG. 8 is a graph illustrating one example of the method of adjusting the battery temperature.

FIG. 8 illustrates one of concrete examples of the method of adjusting the battery temperature.

At time t0, after the engine 201 is started, the vehicle speed increases gradually and soon becomes a substantially constant vehicle speed. The water temperature of the cylinder head 203 rises gradually from time t0, and even after the vehicle speed becomes constant, it continues rising for a while. Then, the water temperature continues rising for a while after exceeded the first threshold temperature.

The estimated value of the ambient temperature of the lower part of the powertrain unit 200 rises, slightly after the rise of the water temperature. Then, at time t1, the ambient temperature reaches the first threshold temperature.

Since the ambient temperature is below the first threshold temperature during Time t0-t1, the ratio of the second intake air amount is set to 0% (i.e., the ratio of the first intake air amount is set to 100%). Moreover, the target water flow amount is set to 0%. Then, while the water-cooled intercooler 700 is controlled at 0% of the amount of water flow, the intake-air-amount adjusting valve 305 is controlled so that the ratio of the first intake air amount becomes 100% (fully opened).

Next, when the ambient temperature begins to exceed the first threshold temperature after Time t1, the ratio of the second intake air amount is set to 20% and the ratio of the first intake air amount is set to 80%, according to the ambient temperature. Moreover, the target water flow amount is set to 20%. The water-cooled intercooler 700 is operated at 20% of the water flow amount, and at the same time or slightly later, the opening of the intake-air-amount adjusting valve 305 is adjusted so that the ratio of the second intake air amount becomes 20%.

After time t2, the water temperature of the cylinder head 203 rises in a state where the vehicle speed hardly changes (for example, traveling an uphill). Accordingly, the estimated value of the ambient temperature also rises. According to the rise of the estimated value of the ambient temperature, the ratio of the second intake air amount is set to 40% and the ratio of the first intake air amount is set to 60%. Moreover, the target water flow amount is set to 40%. Then, the water-cooled intercooler 700 is operated at 40% of the amount of water flow, and at the same time or slightly later, the opening of the intake-air-amount adjusting valve 305 is adjusted so that the ratio of the second intake air amount becomes 40%.

After time t3, the traveling of the uphill is ended, the vehicle speed is in a substantially fixed state, and the water temperature returns to a similar water temperature to the that during time t1 to t2. The estimated value of the ambient temperature also returns to a similar value to that during time t1 to t2. Thus, the operation of the water-cooled intercooler 700 and the intake-air-amount adjusting valve 305 is controlled under a similar condition to that during time t1 to t2.

After time t4, the vehicle speed becomes slower while the water temperature of the cylinder head 203 does not change. At this time, the estimated value of the ambient temperature rises according to the lowering of the vehicle speed. According to the rising of the estimated value of the ambient temperature, the operation of the water-cooled intercooler 700 and the intake-air-amount adjusting valve 305 is controlled under a similar condition to that during Time t2 to t3.

Then, at time t5, the engine 201 is stopped, and the control of the operation of the water-cooled intercooler 700 and the intake-air-amount adjusting valve 305 is ended.

Operation and Effects

In the battery temperature adjusting device 900 and the method of adjusting the battery temperature according to this embodiment, air is taken in through the second air duct 302 provided with the second intake opening 302A which opens toward the space between the transmission 205 and the battery 501. Thus, as illustrated by an arrow D1 in FIG. 1, the heat from the powertrain unit 200 (especially, the lower part thereof) is taken in into the intake passage. Thus, since the heat is removed before it reaches the periphery of battery 501 disposed near the powertrain unit 200, the temperatures of the battery 501 and its periphery can be suppressed from becoming high. Then, since the temperatures of the battery 501 and its periphery can be maintained at the temperature suitable for the excellent charge-and-discharge characteristics of the battery 501, a longer battery life of the vehicle 1 can be secured. Moreover, since the intake system of the engine 201 is used as the device for removing the heat, it is not necessary to additionally provide a dedicated pump, etc. inside the engine bay 100, and it can contribute to the downsizing of the engine bay 100 (as a result, the vehicle 1).

Embodiment 2

Below, other embodiments according to the present disclosure are described in detail. Note that in description of these embodiments, the same reference characters are assigned to the same components as Embodiment 1 to omit detailed description thereof.

Although in Embodiment 1 the water-cooled intercooler 700 built in the intake passage is utilized as the intake air cooling device, it is not limited to this configuration. The intake air cooling device of the present disclosure may be, for example, a cooling device provided to the second air duct 302 itself, or a cooling device other than the water-cooled intercooler 700, which is disposed in the intake passage downstream of the second air duct 302.

Figure 9:
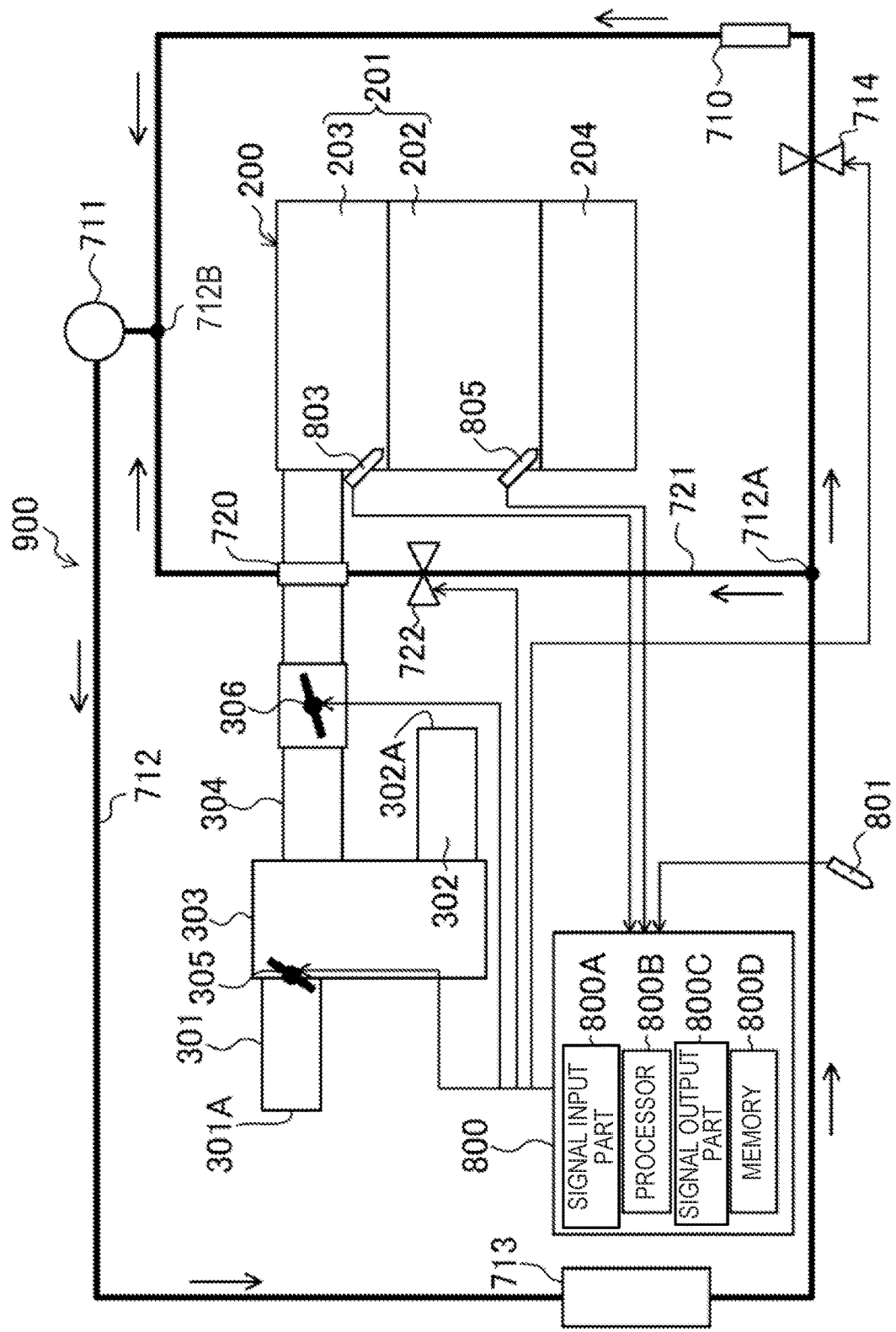
FIG. 9 is a view corresponding to FIG. 6, illustrating a battery temperature adjusting device according to Embodiment 2.

FIG. 9 illustrates a battery temperature adjusting device 900 according to Embodiment 2 as one example, where another intake air cooling device is provided. In the intake air cooling device in this example, a refrigerant circuit for an air conditioning system mounted on the vehicle 1 is branched and a part of refrigerant is used for the cooling of intake air inside the intake passage.

Concretely, the air conditioning system of the vehicle 1 includes a refrigerant circuit 712, and a compressor 711, a condenser 713, an expansion valve 714 for cooling, and an evaporator 710 for cooling, which are disposed in the refrigerant circuit 712. As illustrated by arrows in FIG. 9, the refrigerant inside the refrigerant circuit 712 is used for cooling of air inside the cabin, it is then compressed by the compressor 711 and is sent to the condenser 713 where it is cooled. Then, the refrigerant is decompressed in the expansion valve 714 for cooling, and inside the evaporator 710 for cooling, it absorbs heat from air inside the cabin and evaporates to cool the air inside the cabin.

The intake air cooling device of this example includes a refrigerant circuit 721 for intake-air cooling, and an expansion valve 722 for intake-air cooling and an evaporator 720 for intake-air cooling, which are disposed in the refrigerant circuit 721.

The refrigerant circuit 721 is a circuit which is branched from the refrigerant circuit 712 at a junction 712A, and again joins the refrigerant circuit 712 at a junction 712B. A portion of the refrigerant cooled by the condenser 713 flows into the refrigerant circuit 721 at the junction 712A, and it is decompressed by the expansion valve 722. Then, in the evaporator 720, it absorbs heat from the intake air inside the intake passage and evaporates to cool the intake air.

The expansion valve 722 and the evaporator 720 may be similar to or common to the expansion valve 714 and the evaporator 710.

The expansion valve 714 and the expansion valve 722 are connected to the controller 800, the control signals are outputted from the signal output part 800C of the controller 800 to drive motors of both the expansion valves to control the operations of the valves (i.e., openings).

By controlling the opening of the expansion valve 722, the degree of cooling of the intake air in the evaporator 720 can be adjusted. If the expansion valve 722 is fully closed, since the inflow of the refrigerant to the refrigerant circuit 721 can be suspended, the refrigerant is only used for the air conditioning system. On the other hand, if the expansion valve 722 is fully opened, since the inflow of the refrigerant to the refrigerant circuit 721 becomes the maximum amount, the degree of cooling of the intake air in the evaporator 720 also becomes the maximum degree.

In this example, in order to achieve the target cooling degree, an amount of refrigerant which flows into the refrigerant circuit 721 is calculated at Step S4 in Embodiment 1, and the opening of the expansion valve 722 is controlled at Step S5.

According to this example, since the air conditioning system already mounted on the vehicle 1 can be used as the intake air cooling device, a significant increase in the number of components inside the engine bay 100 can be suppressed, and the intake air can be cooled efficiently, similar to the water-cooled intercooler 700 in Embodiment 1.

Embodiment 3

Figure 10:
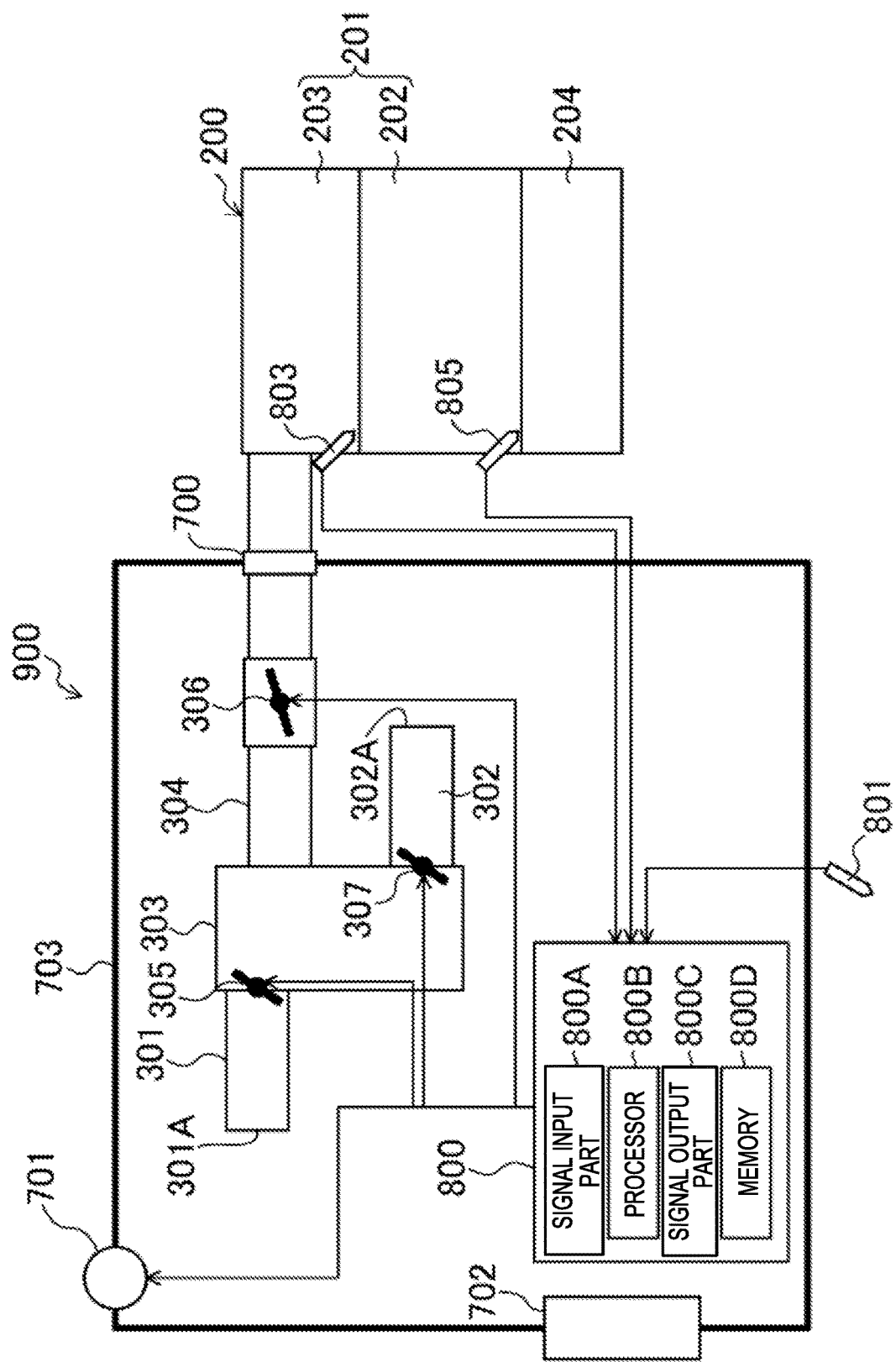
FIG. 10 is a view corresponding to FIG. 6, illustrating a battery temperature adjusting device according to Embodiment 3.

FIG. 10 is a view corresponding to FIG. 6, illustrating a battery temperature adjusting device 900 according to Embodiment 3.

In the example illustrated in FIG. 10, only a configuration of an intake-air-amount adjusting part differs from the configuration of Embodiment 1. In this example, the intake-air-amount adjusting part includes a first valve 305 provided to the first air duct 301 side, and a second valve 307 provided to the second air duct 302 side.

The first valve 305 has the same configuration as the intake-air-amount adjusting valve 305 of Embodiment 1, and can adjust the first intake air amount by controlling the opening. Moreover, the second valve 307 can adjust the second intake air amount by controlling the opening. Although it is not intended to limit, a common flow control valve may be used as the second valve 307, and for example, a similar valve to the intake-air-amount adjusting valve 305 of Embodiment 1 can be used. The first valve 305 and the second valve 307 may be the same type of valve, or may be different type of valve.

In this example, the second valve 307 is also connected to the controller 800, in addition to the first valve 305. The signal output part 800C also outputs a control signal to the drive motor of the second valve 307 to control operation of the second valve 307 (i.e., the opening). Thus, the first intake air amount and the second intake air amount can be adjusted independently by the first valve 305 and the second valve 307, and therefore, the ratios of the first intake air amount and the second intake air amount relative to the total intake air amount can be controlled more accurately.

Note that in this example, there is no limitation in the minimum passage cross-sectional areas of the first air duct 301 and the second air duct 302. Concretely, the first air duct 301 and the second air duct 302 may have the same minimum passage cross-sectional area, or the minimum passage cross-sectional area of the first air duct 301 may be smaller than that of the second air duct 302. In this example, since the first intake air amount and the second intake air amount can be adjusted by the first valve 305 and the second valve 307, respectively, it is not necessary to adjust the intake resistances of the first air duct 301 and the second air duct 302 in advance.

Embodiment 4

Figure 11:
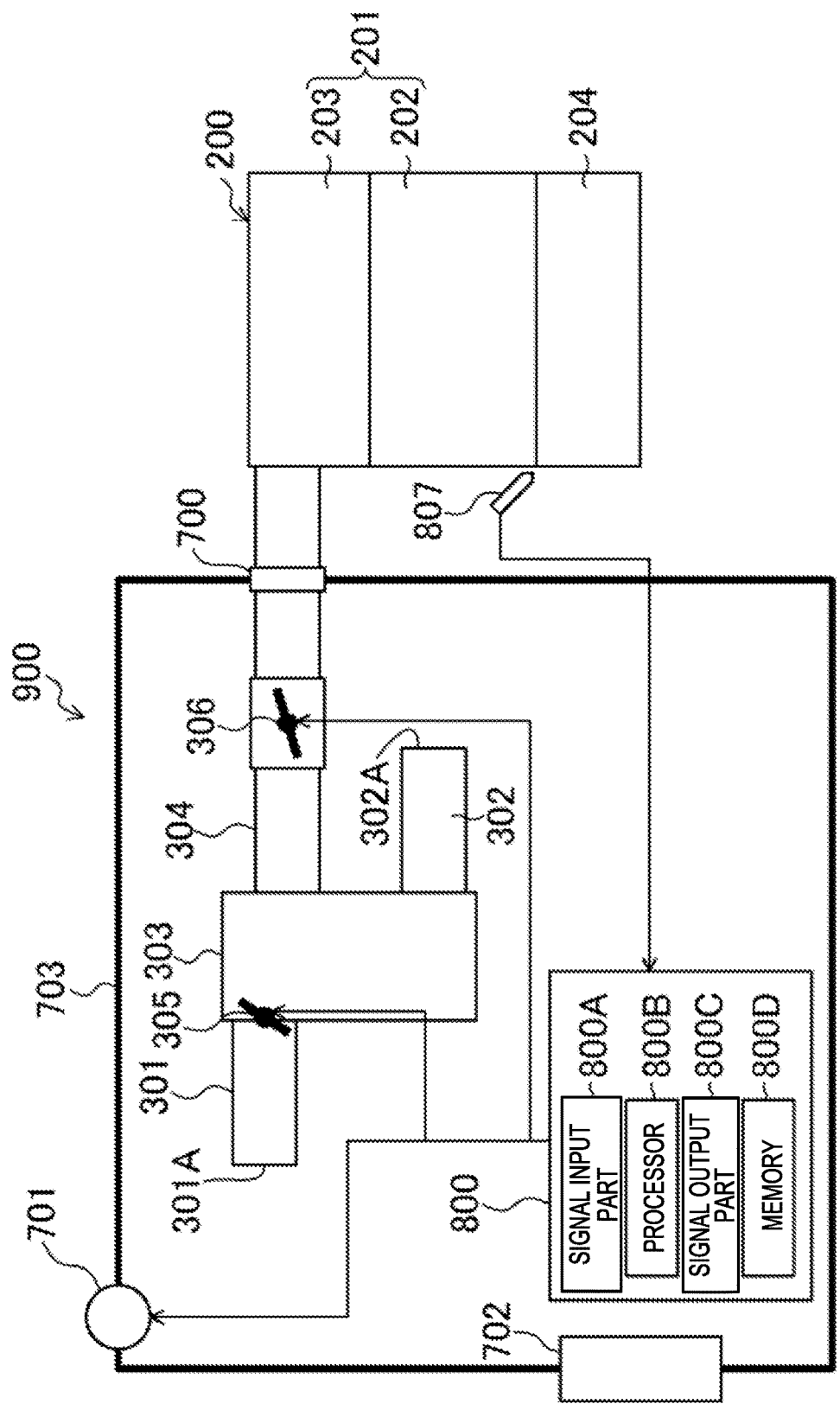
FIG. 11 is a view corresponding to FIG. 6, illustrating a battery temperature adjusting device according to Embodiment 4.

FIG. 11 is a view corresponding to FIG. 6, illustrating a battery temperature adjusting device 900 according to Embodiment 4.

In the example illustrated in FIG. 11, the battery temperature adjusting device 900 is provided with a temperature sensor 807 (ambient temperature sensor) which detects the ambient temperature of the powertrain unit 200, instead of the vehicle speed sensor 801 and the water temperature sensor 803 and/or the oil temperature sensor 805 in Embodiment 1. The temperature sensor 807 is desirably disposed at the powertrain unit 200 (especially, around the lower part), and is especially desirable to be disposed between the transmission 205 and the battery 501.

The temperature sensor 807 is connected to the controller 800, and the ambient temperature detected by the temperature sensor 807 is inputted into the signal input part 800A (ambient temperature acquiring module) as the detection signal.

In Embodiment 1, the controller 800 estimates the ambient temperature based on the vehicle speed and the water temperature and/or the oil temperature. However, in Embodiment 4, the controller 800 controls the opening of the intake-air-amount adjusting valve 305 based on the detection value of the ambient temperature directly detected by the temperature sensor 807.

According to this configuration, since the ambient temperature directly detected by the temperature sensor 807 is used, the ratios of the first intake air amount and the second intake air amount relative to the total intake air amount can be adjusted more accurately.

Other Embodiments

Although in Embodiment 1 the ambient temperature is estimated based on the vehicle speed and the water temperature and/or the oil temperature, since the controller 800 is also connected to the accelerator opening sensor of the vehicle 1, the ambient temperature may be estimated based on the detection value of the accelerator opening sensor and the target torque of the engine 201.

Although in the above embodiments, the engine 201 is the multi-cylinder engine, it is not limited in particular.

Although in the above embodiments the intake air cooling device is provided, it is not necessary to be provided with the intake air cooling device. Moreover, although, in the above embodiments the engine 201 is the front-intake and rear-exhaust engine, it is not limited to this configuration.

Although in the above embodiments the detection value of the vehicle speed sensor 801 is used as the vehicle speed, the vehicle speed may be estimated based on the engine speed and the gear stage.

Since the present disclosure can provide the battery temperature adjusting device for the vehicle, the vehicle provided with the battery temperature adjusting device, and the method of adjusting the battery temperature of the vehicle, which can maintain the temperature of the battery mounted inside the engine bay and its periphery within the suitable temperature range, it is very useful.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims. Further, if used herein, the phrase "and/or" means either or both of two stated possibilities.

DESCRIPTION OF REFERENCE CHARACTERS

1 Vehicle
24 Left Surface Covering Part (Adiabatic Wall)
100 Engine Bay
200 Powertrain Unit
201 Engine
202 Cylinder Block
203 Cylinder Head
204 Oil Pan
205 Transmission
301 First Air Duct (Intake Passage)
301A First Intake Opening (Additional Intake Opening)
302 Second Air Duct (Intake Passage)
302A Second Intake Opening (Intake Opening)
303 Air Cleaner (Intake Passage)
304 Intake Pipe (Intake Passage)
305 Intake-air-amount Adjusting Valve, First Valve (Intake-air-amount Adjusting Part)
306 Throttle Valve (Intake Passage)
307 Second Valve (Intake-air-amount Adjusting Part)
501 Battery
700 Water-Cooled Intercooler (Intake Air Cooling Device)
711 Compressor (Intake Air Cooling Device)
713 Condenser (Intake Air Cooling Device)
721 Intake-air Cooling Refrigerant Circuit (Intake Air Cooling Device)
722 Intake-air Cooling Expansion Valve (Intake Air Cooling Device)
720 Intake-air Cooling Evaporator (Intake Air Cooling Device)
800 Controller
800A Signal Input Part (Ambient Temperature Acquiring Module)
800B Processor (Ambient Temperature Acquiring Module, Determining Module, Calculating Module)
800C Signal Output Part (Controlling Module)
800D Memory
801 Vehicle Speed Sensor
803 Water Temperature Sensor
805 Oil Temperature Sensor
807 Temperature Sensor (Ambient Temperature Sensor)
900 Battery Temperature Adjusting Device
S1 Ambient Temperature Acquiring Step
S2 Temperature Determining Step
S3 Second Intake-air-amount Ratio Calculating Step
S4 Target Water Flow Amount Calculating Step
S5 Electric Water Pump Controlling Step
S6 Intake-air-amount Controlling Step

What is claimed is:

1. A battery temperature adjusting device for a vehicle on which a battery is mounted, the battery being a lithium ion battery disposed near a powertrain unit inside an engine bay, comprising:
   a first air duct provided to an intake passage configured to lead intake air to a combustion chamber of an engine;
   a second air duct provided to the intake passage and provided with an intake opening that opens toward a space between the powertrain unit and the battery;
   an intake-air-amount adjusting part configured to adjust a first intake air amount introduced from the first air duct and a second intake air amount introduced from the second air duct; and
   a controller configured to acquire an ambient temperature of the powertrain unit and control operation of the intake-air-amount adjusting part based on the ambient temperature,
   wherein the controller increases a ratio of the second intake air amount relative to the sum of the first intake air amount and the second intake air amount, when the controller determines that the ambient temperature exceeds a first threshold temperature, compared with when the controller determines that the ambient temperature is below the first threshold temperature.

2. The battery temperature adjusting device of claim 1, wherein the battery is disposed by the side of an upper part of the powertrain unit, and wherein the ambient temperature is an ambient temperature of a lower part of the powertrain unit.

3. The battery temperature adjusting device of claim 2, wherein the battery is disposed above a transmission of the powertrain unit, and
wherein the intake opening opens toward a space between the transmission and the battery.

4. The battery temperature adjusting device of claim 3, further comprising:
a vehicle speed sensor connected to the controller and configured to detect a traveling speed of the vehicle; and
a temperature sensor connected to the controller and configured to detect a water temperature and/or an oil temperature of the engine,
wherein the controller estimates the ambient temperature based on the traveling speed and the water temperature and/or the oil temperature.

5. The battery temperature adjusting device of claim 3, further comprising an ambient temperature sensor connected to the controller and configured to detect the ambient temperature,
wherein the controller controls operation of the intake-air-amount adjusting part based on the ambient temperature detected by the ambient temperature sensor.

6. The battery temperature adjusting device of claim 5, wherein the controller increases an increasing rate of the ratio of the second intake air amount as the ambient temperature increases, when increasing the ratio of the second intake air amount.

7. The battery temperature adjusting device of claim 6, wherein the controller increases the increasing rate of the ratio of the second intake air amount as the traveling speed decreases, when increasing the ratio of the second intake air amount.

8. The battery temperature adjusting device of claim 7, further comprising an intake air cooling device disposed downstream of the second air duct in the intake passage and configured to cool intake air inside the intake passage,
wherein the controller increases a degree of cooling of the intake air by the intake air cooling device, when increasing the ratio of the second intake air amount.

9. The battery temperature adjusting device of claim 8, wherein the intake air cooling device is a water-cooled intercooler built in the intake passage.

10. The battery temperature adjusting device of claim 8, wherein the intake air cooling device is a part of a refrigerant circuit of an air conditioning system mounted on the vehicle.

11. The battery temperature adjusting device of claim 1, wherein a minimum passage cross-sectional area of the first air duct is larger than a minimum passage cross-sectional area of the second air duct, and
wherein the intake-air-amount adjusting part is an intake-air-amount adjusting valve provided to the first air duct side.

12. The battery temperature adjusting device of claim 1, wherein the intake-air-amount adjusting part includes:
a first valve provided to the first air duct side and configured to adjust the first intake air amount; and
a second valve provided to the second air duct side and configured to adjust the second intake air amount.

13. A vehicle provided with the battery temperature adjusting device of claim 1.

14. A method of adjusting a battery temperature of a vehicle on which a battery is mounted, the battery being a lithium ion battery disposed near a powertrain unit in an engine bay, the vehicle including:
a first air duct provided to an intake passage configured to lead intake air to a combustion chamber of an engine;
a second air duct provided to the intake passage and provided with an intake opening that opens toward a space between the powertrain unit and the battery; and
an intake-air-amount adjusting part configured to adjust a first intake air amount introduced from the first air duct and a second intake air amount introduced from the second air duct, and the method comprising:
acquiring an ambient temperature of the powertrain unit by one of an estimation and a detection;
determining whether the ambient temperature exceeds a first threshold temperature; and
increasing a ratio of the second intake air amount relative to the sum of the first intake air amount and the second intake air amount, when the ambient temperature is determined to exceed the first threshold temperature, compared with when the ambient temperature is determined to be below the first threshold temperature, by controlling operation of the intake-air-amount adjusting part.

15. The battery temperature adjusting device of claim 1, further comprising:
a vehicle speed sensor connected to the controller and configured to detect a traveling speed of the vehicle; and
a temperature sensor connected to the controller and configured to detect a water temperature and/or an oil temperature of the engine,
wherein the controller estimates the ambient temperature based on the traveling speed and the water temperature and/or the oil temperature.

16. The battery temperature adjusting device of claim 1, further comprising an ambient temperature sensor connected to the controller and configured to detect the ambient temperature,
wherein the controller controls operation of the intake-air-amount adjusting part based on the ambient temperature detected by the ambient temperature sensor.

17. The battery temperature adjusting device of claim 1, wherein the controller increases an increasing rate of the ratio of the second intake air amount as the ambient temperature increases, when increasing the ratio of the second intake air amount.

18. The battery temperature adjusting device of claim 1, further comprising a vehicle speed sensor connected to the controller and configured to detect the traveling speed,
wherein the controller increases an increasing rate of the ratio of the second intake air amount as the traveling speed decreases, when increasing the ratio of the second intake air amount.

19. The battery temperature adjusting device of claim 1, further comprising an intake air cooling device disposed downstream of the second air duct in the intake passage and configured to cool intake air inside the intake passage,
wherein the controller increases a degree of cooling of the intake air by the intake air cooling device, when increasing the ratio of the second intake air amount.

* * * * *